(12) United States Patent
Beale et al.

(10) Patent No.: US 12,393,747 B2
(45) Date of Patent: Aug. 19, 2025

(54) PERFORMANCE IMPACT DETECTION USING QUEUING CURVE ANALYSIS

(71) Applicant: Dell Products L.P., Round Rock, TX (US)

(72) Inventors: Peter Beale, Acton, MA (US); Wenjin Liu, Cary, NC (US); Siva Rama Krishna Kottapalli, North Chelmsford, MA (US)

(73) Assignee: Dell Products L.P., Round Rock, TX (US)

( * ) Notice: Subject to any disclaimer, the term of this patent is extended or adjusted under 35 U.S.C. 154(b) by 932 days.

(21) Appl. No.: 17/168,405

(22) Filed: Feb. 5, 2021

(65) Prior Publication Data

US 2022/0253570 A1    Aug. 11, 2022

(51) Int. Cl.
*G06F 30/20* (2020.01)
*G05B 13/02* (2006.01)
(Continued)

(52) U.S. Cl.
CPC .............. *G06F 30/20* (2020.01); *G06F 3/061* (2013.01); *G05B 13/021* (2013.01);
(Continued)

(58) Field of Classification Search
CPC ........................... G06F 30/20; G06F 2111/10
See application file for complete search history.

(56) References Cited

U.S. PATENT DOCUMENTS 7,640,231 B2 * 12/2009 Alvarez .................... G06F 9/50
7,720,955 B1 * 5/2010 Kelly ................. G06F 11/3447
709/223

(Continued)

OTHER PUBLICATIONS

M. Awawdeh, et al.,, "Application of Outlier Detection using Re-Weighted Least Squares and R-squared for IoT Extracted Data," 2019 Advances in Science and Engineering Technology International Conferences (ASET), Dubai, United Arab Emirates, 2019, pp. 1-6, doi: 10.1109/ICASET. (Year: 2019).*

(Continued)

*Primary Examiner* — Akash Saxena
(74) *Attorney, Agent, or Firm* — Ryan, Mason & Lewis, LLP

(57) ABSTRACT

An apparatus comprises a processing device configured to obtain performance data for a plurality of workloads, to select a subset of the performance data corresponding to a subset of the plurality of workloads having a given workload type, and to generate a model characterizing an expected performance of the given workload type by analyzing the selected subset of the performance data to estimate a queuing curve characterizing the expected performance of the given workload type. The processing device is also configured, responsive to determining that a quality of the generated model is above a designated threshold quality level, to utilize the generated model to identify performance impacting events for a given workload of the given workload type and to modify provisioning of compute, storage and network resources allocated to the given workload responsive to identifying performance impacting events for the given workload of the given workload type.

20 Claims, 18 Drawing Sheets

(51) Int. Cl.

| | | |
|---|---|---|
| *G05B 13/04* | (2006.01) | |
| *G06F 3/06* | (2006.01) | |
| *G06F 11/34* | (2006.01) | |
| *G06F 111/10* | (2020.01) | |

(52) U.S. Cl.
CPC .......... *G05B 13/042* (2013.01); *G06F 11/34* (2013.01); *G06F 2111/10* (2020.01); *G06F 2209/5019* (2013.01); *G06F 2209/5022* (2013.01)

(56) References Cited

U.S. PATENT DOCUMENTS

| | | | | |
|---|---|---|---|---|
| 9,432,256 | B2* | 8/2016 | Terayama | G06F 11/34 |
| 9,465,548 | B1* | 10/2016 | Hrischuk | G06F 11/3447 |
| 9,514,022 | B1* | 12/2016 | Basak | G06F 11/3447 |
| 10,809,936 | B1* | 10/2020 | Kaushik | G06F 3/067 |
| 11,586,534 | B2* | 2/2023 | Qin | G06F 11/3692 |
| 2007/0022142 | A1* | 1/2007 | Palmer | G06Q 10/06 |
| 2013/0081025 | A1* | 3/2013 | Nardelli | G05B 13/021 |
| | | | | 718/101 |
| 2015/0199139 | A1* | 7/2015 | Faulkner | G06F 3/067 |
| | | | | 711/114 |
| 2015/0286409 | A1* | 10/2015 | Chandra | G06F 3/067 |
| | | | | 711/170 |
| 2016/0349992 | A1* | 12/2016 | Basak | G06F 3/0647 |
| 2017/0153962 | A1* | 6/2017 | Biegun | G06F 11/3024 |
| 2018/0028162 | A1* | 2/2018 | Swezey | G06F 15/02 |
| 2019/0342391 | A1* | 11/2019 | Jain | G06F 3/0689 |
| 2019/0373060 | A1* | 12/2019 | Hrischuk | H04L 67/1097 |
| 2020/0333978 | A1* | 10/2020 | Arnold | G06F 3/067 |
| 2020/0394075 | A1* | 12/2020 | Dutta | G06F 3/061 |
| 2021/0019397 | A1* | 1/2021 | Lemberg | G06F 11/3452 |
| 2023/0031109 | A1* | 2/2023 | Fettaya | G06F 11/0709 |
| 2023/0129647 | A1* | 4/2023 | Dutta | G06F 3/061 |
| | | | | 718/105 |
| 2024/0046180 | A1* | 2/2024 | Ma | G06F 18/23213 |

OTHER PUBLICATIONS

Dell Technologies, "Dell EMC CloudIQ: A Detailed Review," Technical White Paper, Nov. 2020, 106 pages.

S.-H. Kim et al., "Statistical Analysis with Little's Law," Operations Research, vol. 61, No. 4, Jul.-Aug. 2013, pp. 1030-1045.

K. Sookocheff, "Using Little's Law to Measure System Performance," https://sookocheff.com/post/modeling/littles-aw/, Nov. 29, 2019, 5 pages.

* cited by examiner

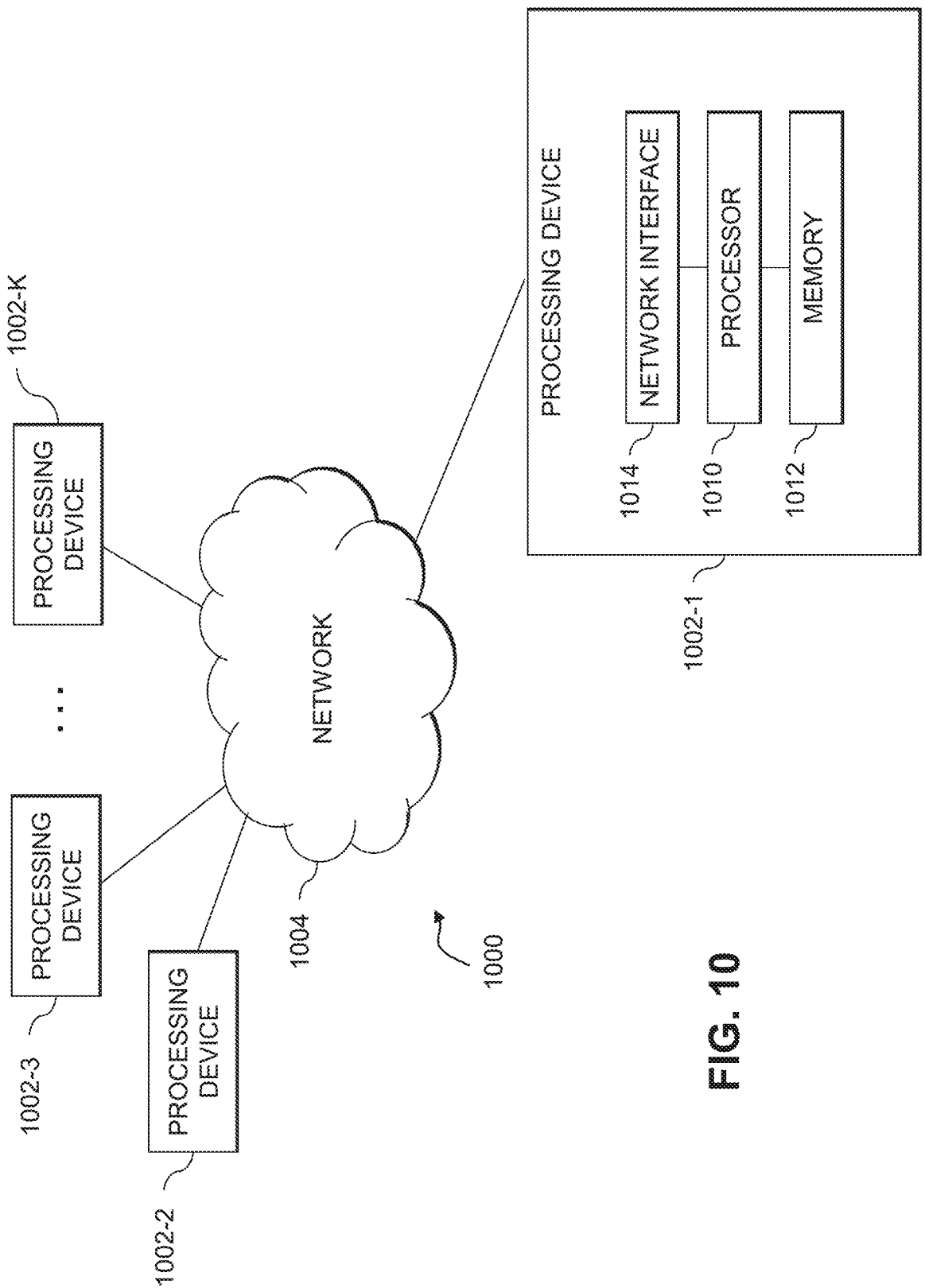

PERFORMANCE IMPACT DETECTION USING QUEUING CURVE ANALYSIS

FIELD

The field relates generally to information processing, and more particularly to storage in information processing systems.

BACKGROUND

Information processing systems may provision storage resources of various storage systems for use by different users. The different users, for example, may have associated storage pools each comprising storage resources provisioned from one or more storage systems. Each storage system may therefore run multiple different workloads. The different workloads may be associated with a same user, or different users. Each of the workloads may have its own unique demand or storage profile, and the various workloads running on a given storage system share various resources of the given storage system.

SUMMARY

Illustrative embodiments of the present disclosure provide techniques for detecting performance impacting events using queuing curve analysis.

In one embodiment, an apparatus comprises at least one processing device comprising a processor coupled to a memory. The at least one processing device is configured to perform the steps of obtaining performance data for a plurality of workloads, the plurality of workloads comprising two or more different types of workloads, selecting a subset of the performance data corresponding to a subset of the plurality of workloads having a given workload type, and generating a model characterizing an expected performance of the given workload type by analyzing the selected subset of the performance data to estimate a queuing curve characterizing the expected performance of the given workload type. The at least one processing device is also configured to perform the steps of determining a quality of the generated model and, responsive to determining that the quality of the generated model is above a designated threshold quality level, utilizing the generated model to identify one or more performance impacting events for a given workload of the given workload type. The at least one processing device is further configured to perform the step of modifying provisioning of at least one of compute, storage and network resources allocated to the given workload responsive to identifying one or more performance impacting events for the given workload of the given workload type.

These and other illustrative embodiments include, without limitation, methods, apparatus, networks, systems and processor-readable storage media.

BRIEF DESCRIPTION OF THE DRAWINGS

FIGS. 9 and 10 show examples of processing platforms that may be utilized to implement at least a portion of an information processing system in illustrative embodiments.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
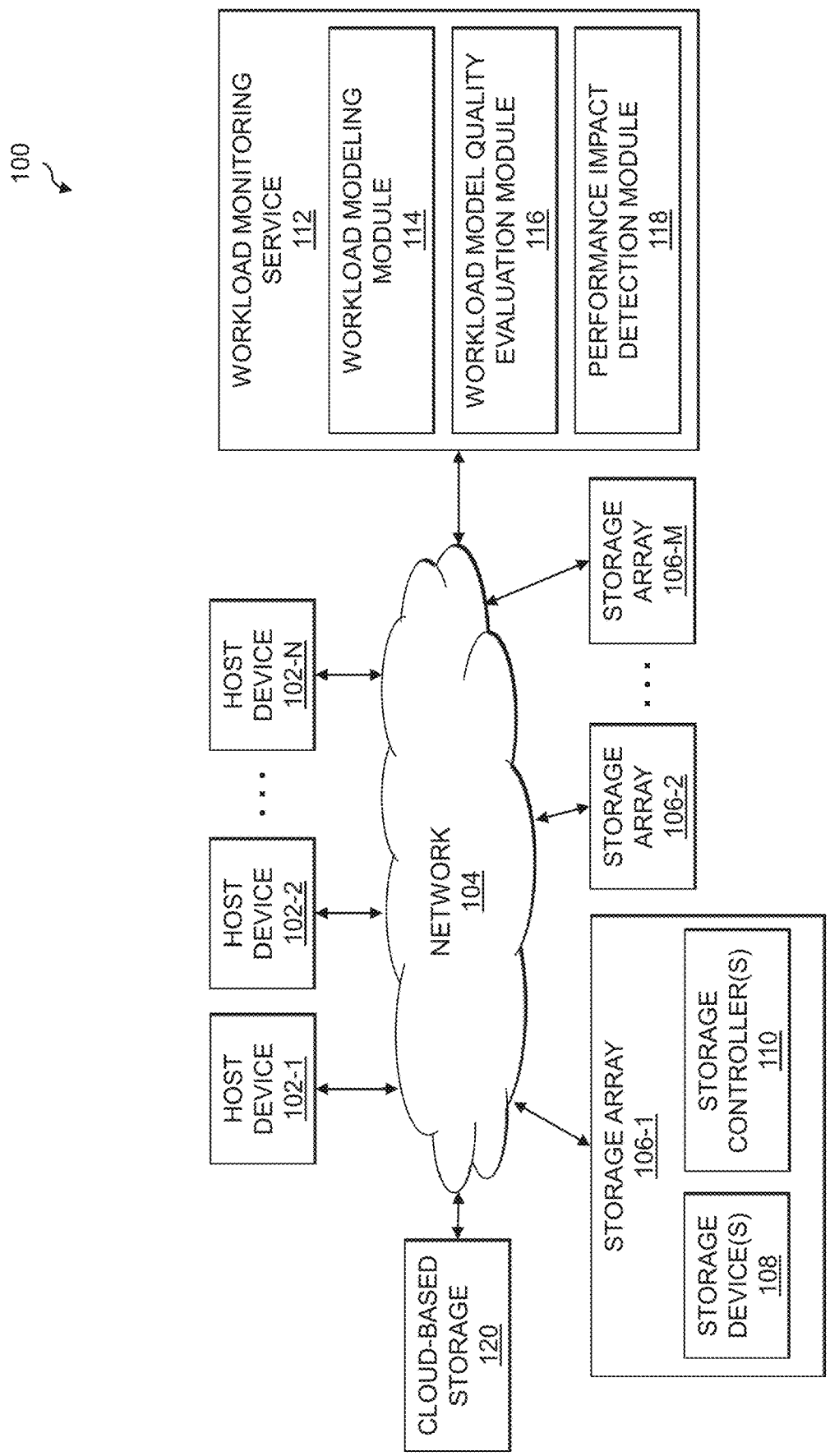
FIG. 1 is a block diagram of an information processing system for detecting performance impacting events using queuing curve analysis in an illustrative embodiment.

FIG. 1 shows an information processing system 100 configured in accordance with an illustrative embodiment to provide functionality for detecting performance impacting events using queuing curve analysis. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106), and possibly cloud-based storage 120. The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The information processing system 100 further includes a workload monitoring service 112 that is configured to provide functionality for detecting performance-impacting events for workloads (e.g., storage workloads running on the storage arrays 106 and/or the cloud-based storage 120). The workload monitoring service 112 is also configured to provide alerts or other notifications to the host devices 102 running such workloads on the storage arrays 106 and/or the cloud-based storage 120, and to implement automated actions for remediating the performance-impacting events (e.g., with or without approval from the host devices 102, as will be described in further detail below), etc. While various embodiments are described with respect to the workload monitoring service 112 detecting performance-impacting events for storage workloads, embodiments are not limited solely to use in detecting performance-impacting events for storage workloads. The workload monitoring service 112 may also or alternatively be used for detecting performance-impacting events for various other types of workloads, including but not limited to compute workloads (e.g., running on host devices 102), network workloads (e.g., running on switches or other network equipment in network 104), combinations of compute, storage and network workloads, etc.

In some embodiments, the workload monitoring service 112 generates alerts and notifications that are provided over the network 104 to the host devices 102, or to a system administrator, information technology (IT) manager, or other authorized personnel via one or more host agents. Such host agents may be implemented via computing or processing devices associated with a system administrator, IT manager or other authorized personnel. Such devices can illustratively comprise mobile telephones, laptop computers, tablet computers, desktop computers, or other types of computers or processing devices configured for communication over network 104 with the workload monitoring service 112. For example, a given host agent may comprise a mobile telephone equipped with a mobile application configured to receive alerts from the workload monitoring service 112. The alert or notification provided to a host agent may highlight particular details of a detected performance-impacting event, such as via a graphical user interface (GUI). The host agent may also provide interface features for selecting particular remedial measures for responding to the alert or notification. Examples of such remedial measures may include altering or modifying the provisioning of storage resources for a particular user, workload or storage system. Modifying provisioning may include allocating additional storage resources to or removing storage resources from a particular user, workload or storage system. Modifying provisioning may also or alternatively include migrating data or a workload between different storage resources or storage systems in response to an alert or notification (e.g., from a first storage array 106-1 to a second storage array 106-2, where the first and second storage arrays 106-1 and 106-2 may have different performance characteristics, capacity, etc.). Modifying provisioning may also or alternatively include throttling a particular workload, adjusting policies, rules or parameters of a particular workload, etc.

It should be noted that a "host agent" as this term is generally used herein may comprise an automated entity, such as a software entity running on a processing device. Accordingly, a host agent need not be a human entity.

The workload monitoring service 112 implements a number of functional modules for detecting performance impacting events using queuing curve analysis. Such functional modules include a workload modeling module 114, a workload model quality evaluation module 116, and a performance impact detection module 118.

The workload monitoring service 112 is configured to obtaining performance data for a plurality of workloads (e.g., storage workloads running on the storage arrays 106 and/or the cloud-based storage 120). The workload modeling module 114 is configured to select a subset of the performance data corresponding to a subset of the plurality of workloads having a given workload type, and to generate a model characterizing an expected performance of the given workload type by analyzing the selected subset of the performance data to estimate a queuing curve characterizing the expected performance of the given workload type. As used herein, "expected" or "normal" performance refers to a range of performance for a given type of workload that is based on historical performance of workloads of that type. As will be described in further detail below, the expected or normal performance may be determined by fitting a curve to historical data using various regression techniques (e.g., linear regression, exponential regression, combinations thereof, etc.). The "best fit" curve may be adjusted to account for expected performance patterns of the workload type.

The workload model quality evaluation module 116 is configured to determine a quality of the generated model. The performance impact detection module 118 is configured, responsive to the workload model quality evaluation module 116 determining that the quality of the generated model is above a designated threshold quality level, to utilize the generated model to identify one or more performance impacting events for a given workload of the given workload type. The workload monitoring service 112 is further configured to modify provisioning of at least one of compute, storage and network resources allocated to the given workload responsive to identifying one or more performance impacting events for the given workload of the given workload type.

At least portions of the functionality of the workload modeling module 114, the workload model quality evaluation module 116, and the performance impact detection module 118 may be implemented at least in part in the form of software that is stored in memory and executed by a processor.

Although shown as external to the host devices 102 and storage arrays 106 in the FIG. 1 embodiment, it should be appreciated that the workload monitoring service 112 in other embodiments may be implemented at least in part internal to one or more of the host devices 102 and/or one or more of the storage arrays 106 (e.g., such as on the storage controllers 110 of storage array 106-1).

The host devices 102, storage arrays 106 and workload monitoring service 112 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102, the storage arrays 106 and the workload monitoring service 112 may be implemented on respective distinct processing platforms, although numerous other arrangements are possible. For example, in some embodiments at least portions of one or more of the host devices 102, the storage arrays 106 and the workload monitoring service 112 are implemented on the same processing platform. The workload monitoring service 112, one or more of the storage arrays 106, or combinations thereof, can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random-access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks.

For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 and the workload monitoring service 112 may be implemented at least in part in the first geographic location, the second geographic location, and one or more other geographic locations. Thus, it is possible in some implementations of the system 100 for different ones of the host devices 102, the storage arrays 106 and the workload monitoring service 112 to reside in different data centers.

Numerous other distributed implementations of the host devices 102, the storage arrays 106 and the workload monitoring service 112 are possible. Accordingly, the host devices 102, the storage arrays 106 and the workload monitoring service 112 can also be implemented in a distributed manner across multiple data centers.

Additional examples of processing platforms utilized to implement portions of the system 100 in illustrative embodiments will be described in more detail below in conjunction with FIGS. 9 and 10.

It is to be understood that the particular set of elements shown in FIG. 1 for detecting performance impacting events using queuing curve analysis is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for detecting performance impacting events using queuing curve analysis will now be described in more detail with reference to the flow diagram of FIG. 2. It is to be understood that this particular process is only an example, and that additional or alternative processes for detecting performance impacting events using queuing curve analysis may be used in other embodiments.

In this embodiment, the process includes steps 200 through 210. These steps are assumed to be performed by the workload monitoring service 112 utilizing the workload modeling module 114, the workload model quality evaluation module 116, and the performance impact detection module 118. The process begins with step 200, obtaining performance data for a plurality of workloads, the plurality of workloads comprising two or more different types of workloads. The workloads, for example, may be storage workloads, compute workloads, networking workloads, combinations thereof, etc.

In step 202, a subset of the performance data obtained in step 200 that corresponds to a subset of the plurality of workloads having a given workload type is selected. Different types of metrics may be utilized to determine the workload types of the plurality of workloads. In the context of storage workloads, as an example, the performance data may comprise a plurality of data points each associated with a plurality of metrics, such as latency metrics, IOPS metrics, IO size metrics, percentage of read operation metrics, etc. Step 202 may include dividing the performance data obtained in step 200 into two or more bins based at least in part on the values of at least a subset of such metrics, such as based at least in part on values of the IO size metrics and the percentage of read operations metrics. Selecting the subset of the performance data in step 202 may thus include selecting a given one of the two or more bins. In some embodiments, a bin is not selected as the given bin unless it includes at least a threshold number of data points. Although described in the context of storage workloads, various other types of workloads may be similarly divided into bins based on values of different metrics (e.g., which are good indicators of workload type).

A model characterizing expected (e.g., normal) performance of the given workload type is generated in step 204 by analyzing the selected subset of the performance data to estimate a queuing curve characterizing the expected performance of the given workload type. The performance data obtained in step 200 may include two or more performance metrics, including a latency metric and a utilization metric, and step 204 may include estimating the queuing curve over a range of values of the latency metric and the utilization metric. Estimating the queuing curve over the range of values of the latency metric and the utilization metric may comprise finding a best fitting curve utilizing at least one of linear regression and exponential regression. Estimating the queuing curve over the range of values of the latency metric and the utilization metric may further comprise adjusting the best fitting curve based at least in part on a variance of the selected subset of the performance data. Estimating the queuing curve over the range of values of the latency metric and the utilization metric may further or alternatively comprise dividing the queuing curve into two or more regions of values of the latency metric and the utilization metric, and adjusting each of the two or more regions of the best fitting curve individually. In some embodiments, estimating the queuing curve over the range of values of the latency metric and the utilization metric may further or alternatively comprise determining an expected pattern of the queuing curve, the expected pattern of the queuing curve comprises an increasing curve where the value of the latency metric increases as the value of the utilization metric increases, and adjusting the best fitting curve to fit the expected pattern of the queuing curve.

Figure 2:
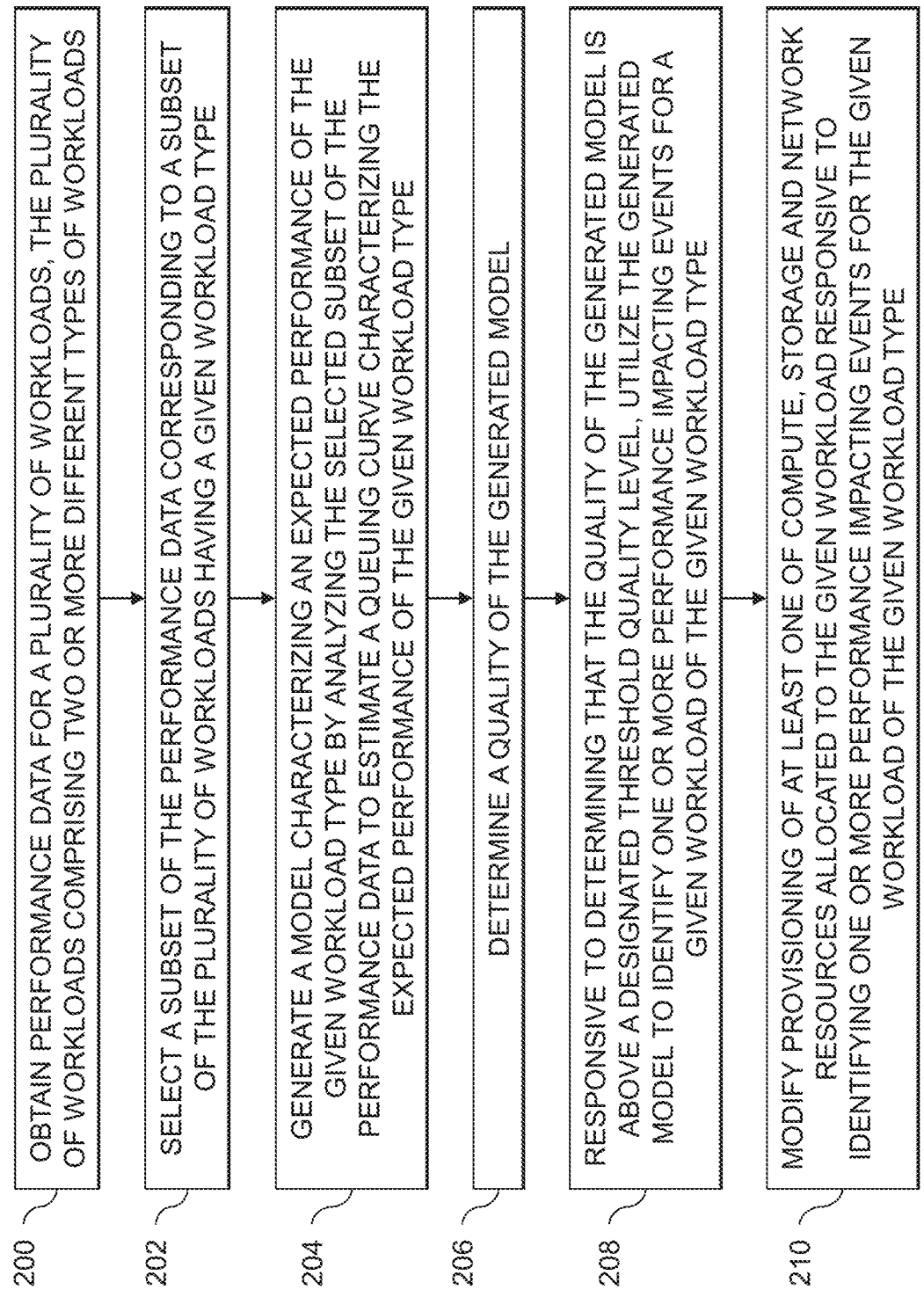
FIG. 2 is a flow diagram of an exemplary process for detecting performance impacting events using queuing curve analysis in an illustrative embodiment.

The FIG. 2 process continues in step 206 with determining a quality of the generated model. Step 206 may include computing a weighted sum of quality scores, the quality scores comprising two or more of: a horizontal score measuring a coverage of the selected subset of the performance data in a first axis of the queuing curve representing a utilization metric for the given workload type; a regression score measuring a fitness of the queuing curve to the selected subset of the performance data; a distance score measuring a distance between portions of the selected subset of the performance data corresponding to the expected performance and portions of the selected subset of the performance data corresponding to performance impacting events; and an aggregation score measuring a duration of performance impacting events.

In step 208, responsive to determining that the quality of the generated model is above a designated threshold quality level, the generated model is utilized to identify one or more performance impacting events for a given workload of the given workload type. Step 208 may include detecting one or more data points in the selected subset of the performance data that are at least a first threshold distance above the queuing curve. Step 208 may further include identifying one or more additional data points in the selected subset of the performance data that are (i) within a designated threshold time of the detected one or more data points and (ii) within a second threshold distance of the queuing curve. Step 208 may also or alternatively include filtering out ones of the detected one or more data points corresponding to a given performance impacting event that lasts less than a designated threshold duration.

In step 210, provisioning of at least one of compute, storage and network resources allocated to the given workload is modified responsive to identifying one or more performance impacting events for the given workload of the given workload type. Step 210 may include generating notifications or alerts which are delivered to users associated with the given workload, enabling such users to select or approve recommended modifications to the provisioning of at least one of compute, storage and network resources which are allocated to the given workload. Where the plurality of workloads comprise storage workloads, step 210 may include allocating additional storage resources to the given workload, migrating the given workload from a first set of storage resources to a second set of storage resources, etc. Similar types of actions may be applied for other types of workloads (e.g., for compute workloads, allocating additional processing or compute resources to the given workload or migrating the given workload from a first set of processing or compute resources to a second set of processing or compute resources, etc.).

Illustrative embodiments provide techniques for modeling different workload types, and for evaluating the quality of models built for specific workload types to determine whether such models are of sufficient quality for detecting performance-impacting events for workloads. Various embodiments will be described with respect to storage workloads that run on storage systems. The techniques described herein, however, may be used for various other workloads, such as compute workloads (e.g., that run on cloud computing platforms, servers, compute farms, etc.), network workloads (e.g., that run on network switches or other network equipment), combinations of storage, compute and/or network workloads, etc. More generally, the techniques described herein may be used for modeling any type of workload that may be characterized in terms of latency and utilization metrics, or other suitable metrics that may be used to generate models for different workload types.

Expected performance of workloads may vary by workload type. As workload types change, the expected performance can also change. It can be difficult, however, to detect changes in performance across many different workload types. Illustrative embodiments provide techniques for observing historical performance data for different workload types in a three-dimensional space over time. In the context of storage workloads, for example, first and second dimensions (e.g., IOPS and latency) are interpreted by queuing theory and the third dimension is workload type. With sufficient historical performance data, algorithms are used to fit the historical performance data to an appropriate queuing curve for each workload type, which helps to identify anomalies (e.g., potential performance-impacting events) for those workload types. For similar times across the workload types, the algorithm can further group anomalies to define a performance impacting event in the time domain. The model produced by the algorithm can be updated frequently to keep track of any changes in the workload and performance (e.g., of storage objects).

In some embodiments, algorithms use historical workload performance data to build a model for each workload type. Each model identifies an expected or normal performance range for its associated workload type. The algorithm may be viewed as including a number of stages, including a model building stage, a model quality evaluation stage, and a performance impact detection stage. The model building stage utilizes modeling methods which leverage queuing theory to analyze historical performance data against queuing curves. By projecting the performance of each isolated workload type into two dimensions (e.g., for storage workloads, IO latency and IO rate or utilization), the model with enough historical performance data can estimate the demonstrated queuing curve that each workload type operates on normally. Deviations from the normal curve for a given workload type can be identified to indicate samples or data points that have been impacted by a performance degradation not related to the given workload type (e.g., an anomaly for the given workload type). The model quality evaluation stage may use multiple scores to evaluate various aspects of the generated models. As will be described in further detail below, the performance impact detection stage provides several optional steps to meet specific needs of different use case scenarios.

Advantageously, illustrative embodiments provide a novel approach for using queuing curve analysis to detect performance impacts for different workload types. This approach learns from historical workload performance data, and divides historical workload performance data by workload type. Models are built and evaluated for different workload types, such that performance impact detection can be performed for each different workload type. The models for different workload types may be updated frequently, to keep track of workload performance changes. This advantageously produces results with much better consistency and accuracy than conventional approaches.

Performance impact detection may utilize algorithms that are based on Little's law and covariance analysis. Such algorithms are designed to detect performance impacts for workloads with characteristics that are not changing (e.g., which have a steady IO rate and IO size) over a period of time (e.g., at least an hour), and thus may miss performance impacts in workloads that are changing significantly over shorter time periods. Thus, such approaches may produce inconsistent results with high false positive and false negative rates. Such approaches further fail to learn from historical workload performance data, such as historical workload performance data for storage objects for storage workloads. Illustrative embodiments utilize powerful statistical and machine learning techniques to learn from historical workload performance data and to detect changes in performance across different workload types thereby producing results with significantly improved accuracy.

Figure 3:
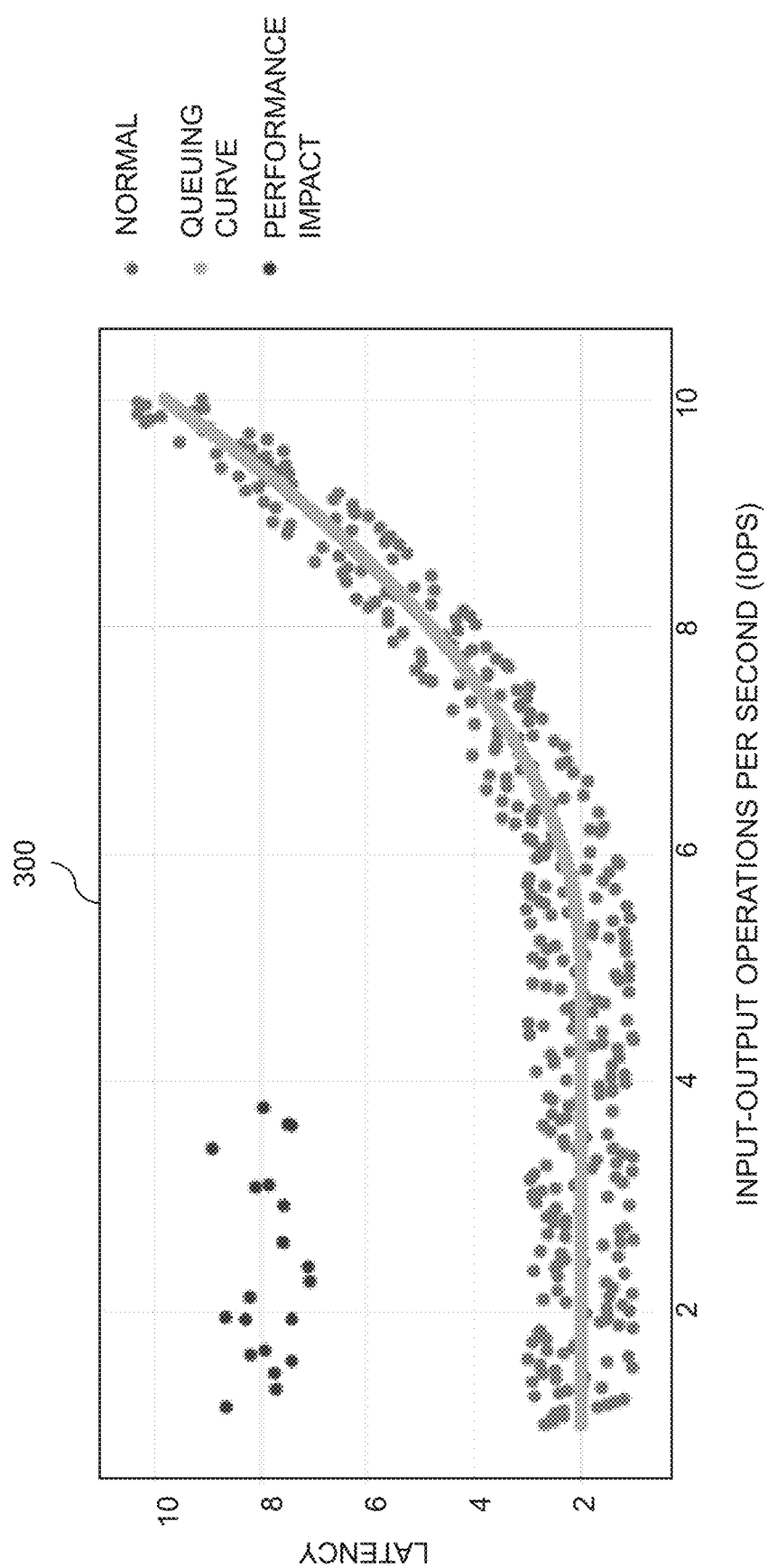
FIG. 3 shows a plot of queueing curve for storage workloads in an illustrative embodiment.

FIG. 3 shows an example plot 300 of latency versus IOPS for storage workloads. The plot 300 includes a queuing curve, along with a number of data points indicating normal behavior and performance impacting events (also referred to as performance impacts). Under normal conditions, IOPS and latency for the storage workloads exhibit a relationship similar to the queuing curve. Performance impacts, however, are characterized by much higher latency than the queuing curve for a designated IOPS. In some embodiments, a model is built for each workload type to define the expected or normal performance range for each workload type. Multiple scores or metrics are used to evaluate various aspects of the generated models, and a final score may be calculated to evaluate overall model quality.

Prior to the workload building or generation stage, data preprocessing may be performed. In the description below, various metrics are utilized for storage workloads. Such metrics include IOPS, latency, IO size, a percentage or read operations (%_read). In particular, IO size and %_read metrics may be used to indicate storage workload type. Thus, historical performance data may be divided into different "bins" based on IO size and %_read metrics. The data within each bin is assumed to have similar storage workloads, and thus each bin may represent a storage workload type. Bins with a sufficient amount of data (e.g., at least a threshold number of data points, such as 1000 data points) are subject to the model building process, where each bin is processed separately (e.g., to build models for each different storage workload type).

Figure 4:
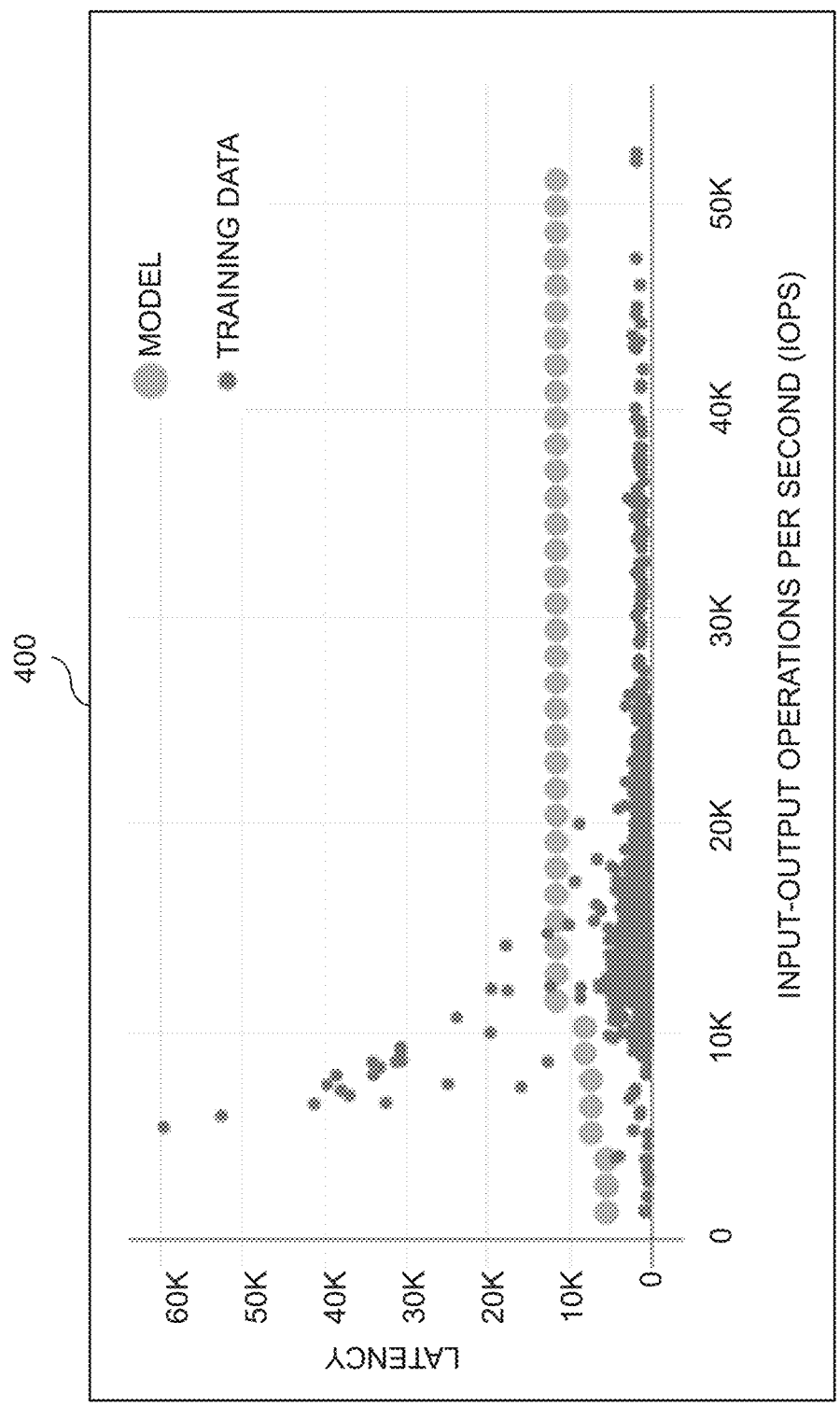
FIG. 4 shows a plot of a model generated for a storage workload type in an illustrative embodiment.

FIG. 4 shows a plot 400 of latency versus IOPS for a given "bin" of historical performance workload data corresponding to a given storage workload type. The plot 400 illustrates model building and update for the given storage workload type. The model building process may begin with finding a best fitting curve, C, by using linear regression, exponential regression or other suitable regression techniques. The curve C is then adjusted by variance σ, where α is an adjustable coefficient. To achieve the best result, the curve C may be divided into multiple smaller regions, with adjustment being done in each region according to:

$$C=C+\alpha*\sigma.$$

Normally, the "latency versus IOPS" curve for storage workloads is an increasing curve. Data points that are against this normal pattern (e.g., data points which fit better with a decreasing curve) are found, and the curve C may be adjusted by these data points. The curve C is then adjusted to be an increasing curve, with the final curve C providing the model which defines the expected or normal performance range for the given workload type. The model may be retrained and updated frequently (e.g., every day, or some other user-configurable time period).

In the model quality evaluation stage, multiple scores are developed and evaluated for the models generated during the model building stage. In some embodiments, the following model scores are utilized: horizontal score, regression score, distance score, aggregation score and final score. Hscore represents the horizontal score, which is a measure of the coverage of the training data in the x-axis (e.g., IOPS). Rscore represents the regression score, which measures the fitness of the regression curve to the training data. Dscore represents the distance score, which measures the distance between normal and impacted data. Ascore represents the aggregation score, which measures the duration of performance impacts. Fscore represents the final score, which may be calculated as a weighted sum of Hscore, Rscore, Dscore and Ascore as follows:

$$F\text{score}=\alpha_1*H\text{score}+\alpha_2*R\text{score}+\alpha_3 D\text{score}+\alpha_4*A\text{score}.$$

Figure 5A:
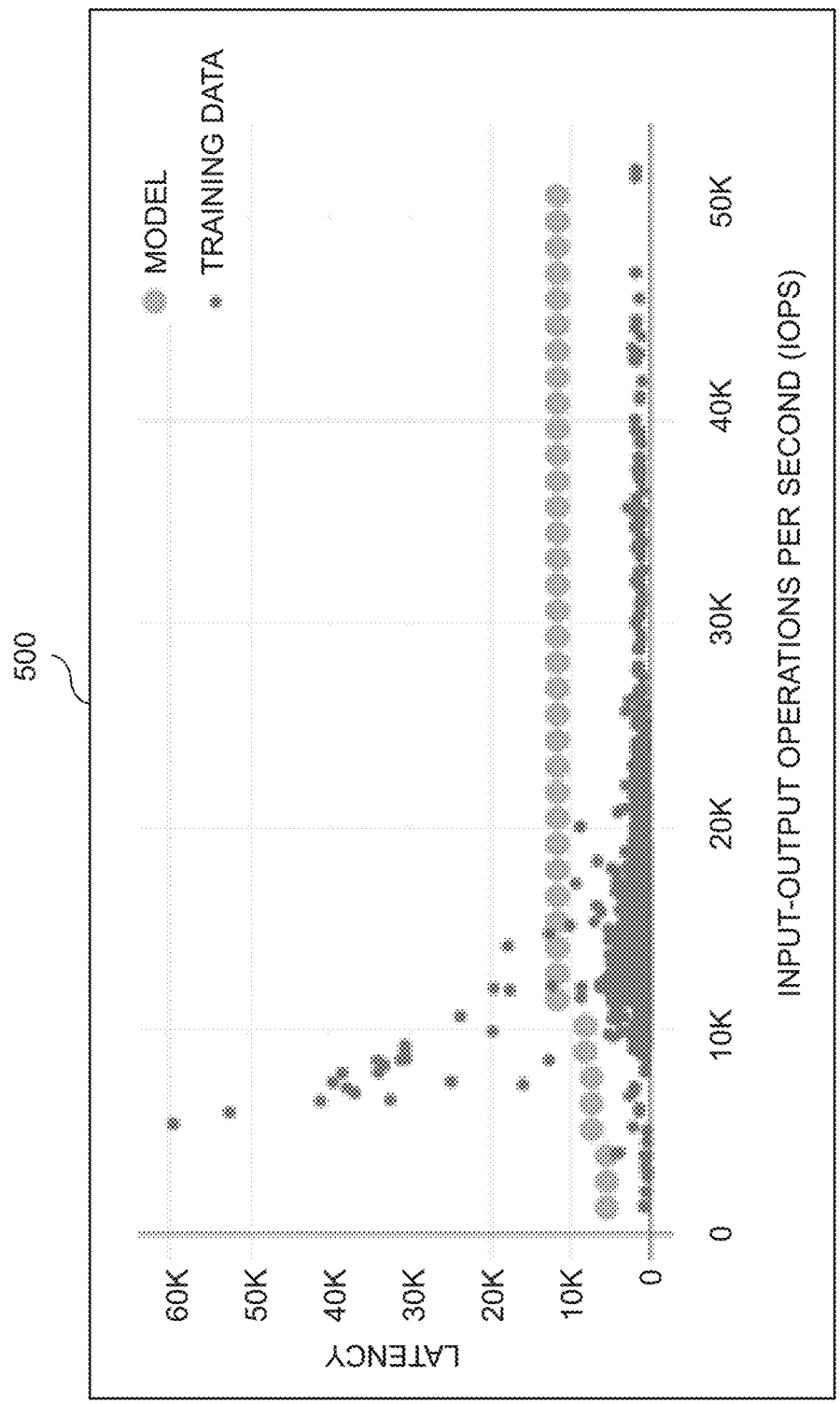
FIGS. 5A and 5B show examples of high and low quality models generated for different storage workload types in an illustrative embodiment.
Figure 5B:
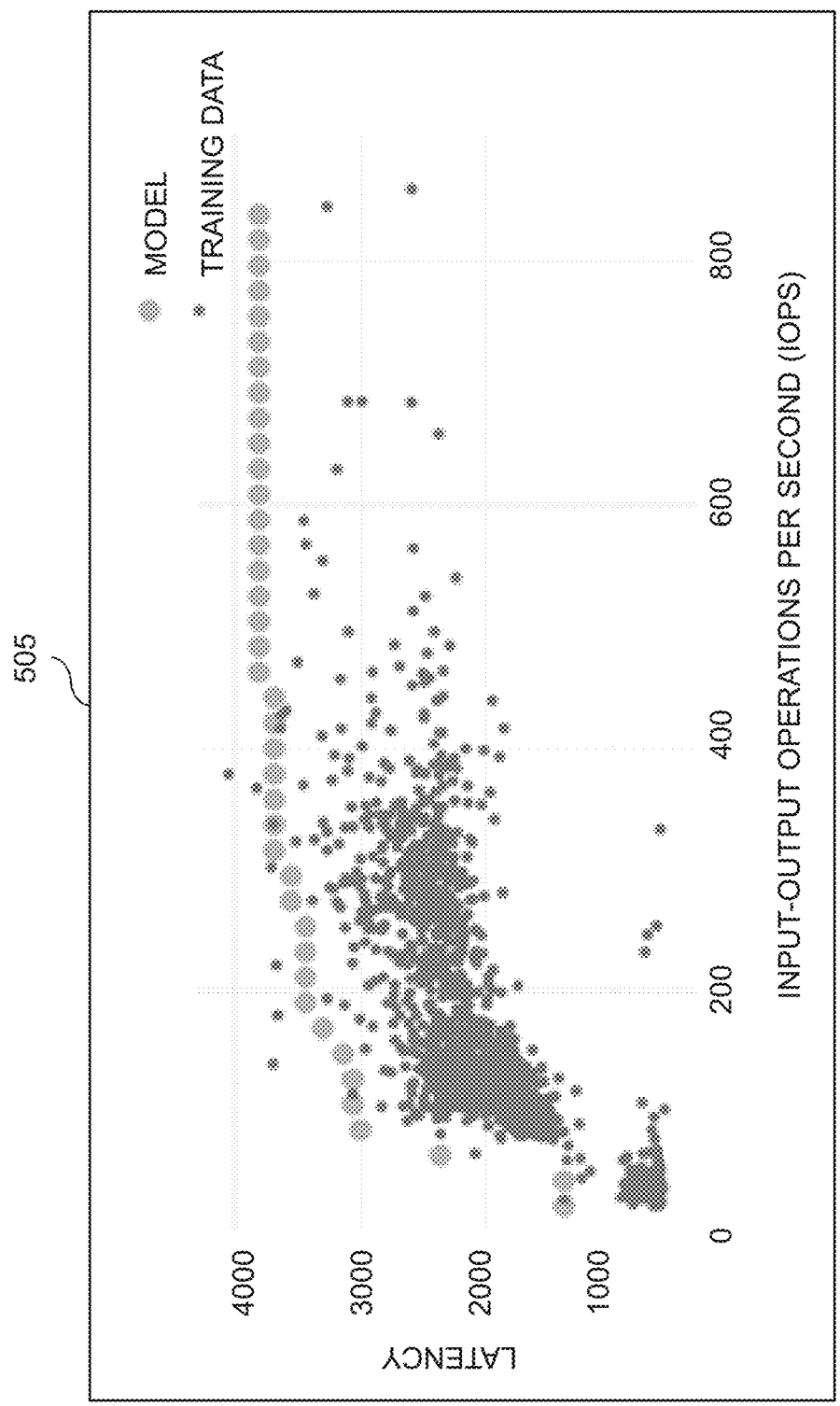

The weights $\alpha_1$, $\alpha_2$, $\alpha_3$ and $\alpha_4$ may be adjusted as desired for a particular use case. FIGS. 5A and 5B show respective plots 500 and 505 of latency versus IOPS for different workload types. The plot 500 of FIG. 5A represents a high quality model, while the plot 505 of FIG. 5B represents a low quality model. For example, the model in plot 500 has an Hscore=0.95, RScore=0.67, Dscore=0.82, Ascore=0.22 and Fscore=1.00. The model in plot 505 has an Hscore=0.80, RScore=0.46, Dscore=0.03, Ascore=0.06 and Fscore=0.24. The cutoff between what is considered a "high" quality model and a "low" quality model may be based on values of the different scores (e.g., Hscore, Rscore, Dscore, Ascore and Fscore). For example, a high quality model may be one whose Fscore is above some designated score threshold. As another example, a high quality model may need to meet multiple score thresholds, such as designated minimum threshold scores for each of at least a subset of the different scores (e.g., at least a designated minimum Hscore, at least a designated minimum Rscore, at least a designated minimum Dscore, at least a designated minimum Ascore, and at least a designated minimum Fscore).

Figure 6A:
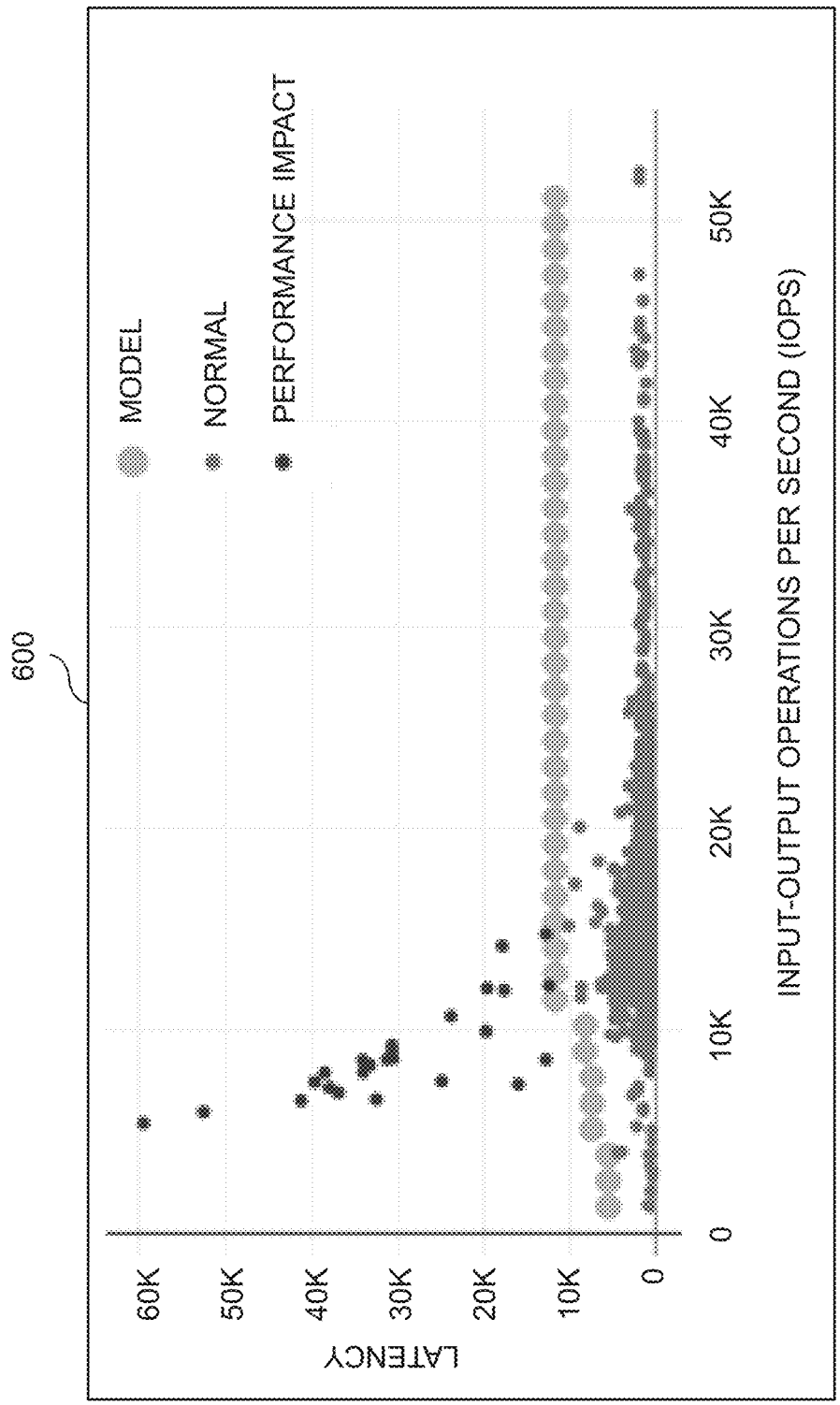
FIGS. 6A and 6B show plots illustrating performance impact detection using a generating model in an illustrative embodiment.
Figure 6B:
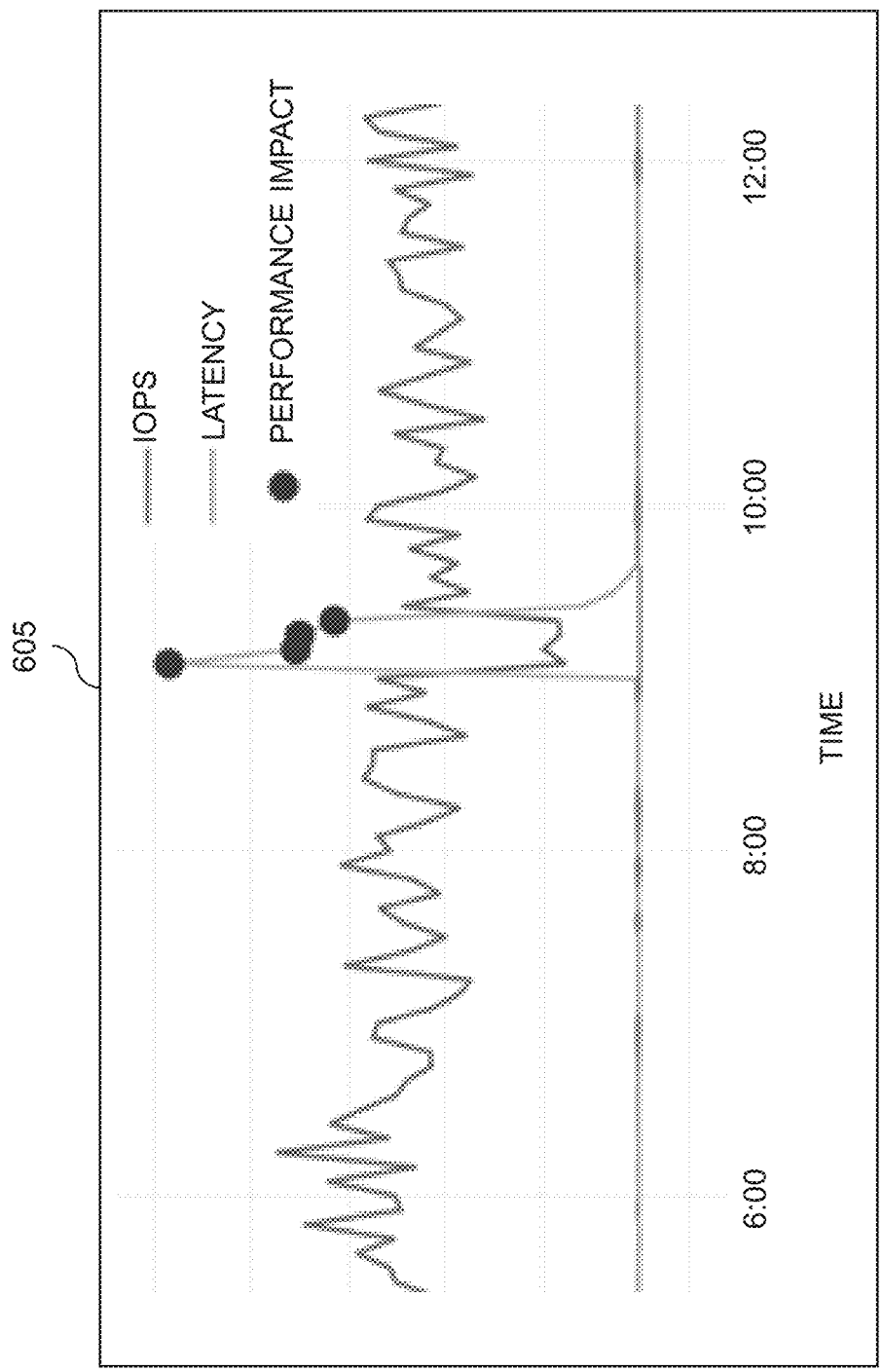

FIG. 6A shows a plot 600 of latency versus IOPS for a given storage workload type, illustrating a model generated utilizing the techniques described above, as well as a set of normal data points and performance impact data points. FIG. 6B shows a plot 605 of IOPS and latency over time, with performance impact data points highlighted. The model shown in plot 600 defines "normal" performance for the given storage workload type. Data points that are above the model line (e.g., by at least some designated distance threshold) are identified as performance impacts. The plot 605 further illustrates the performance impact data points, which in this example correspond to data points where the latency curve is above the IOPS curve.

Figure 7A:
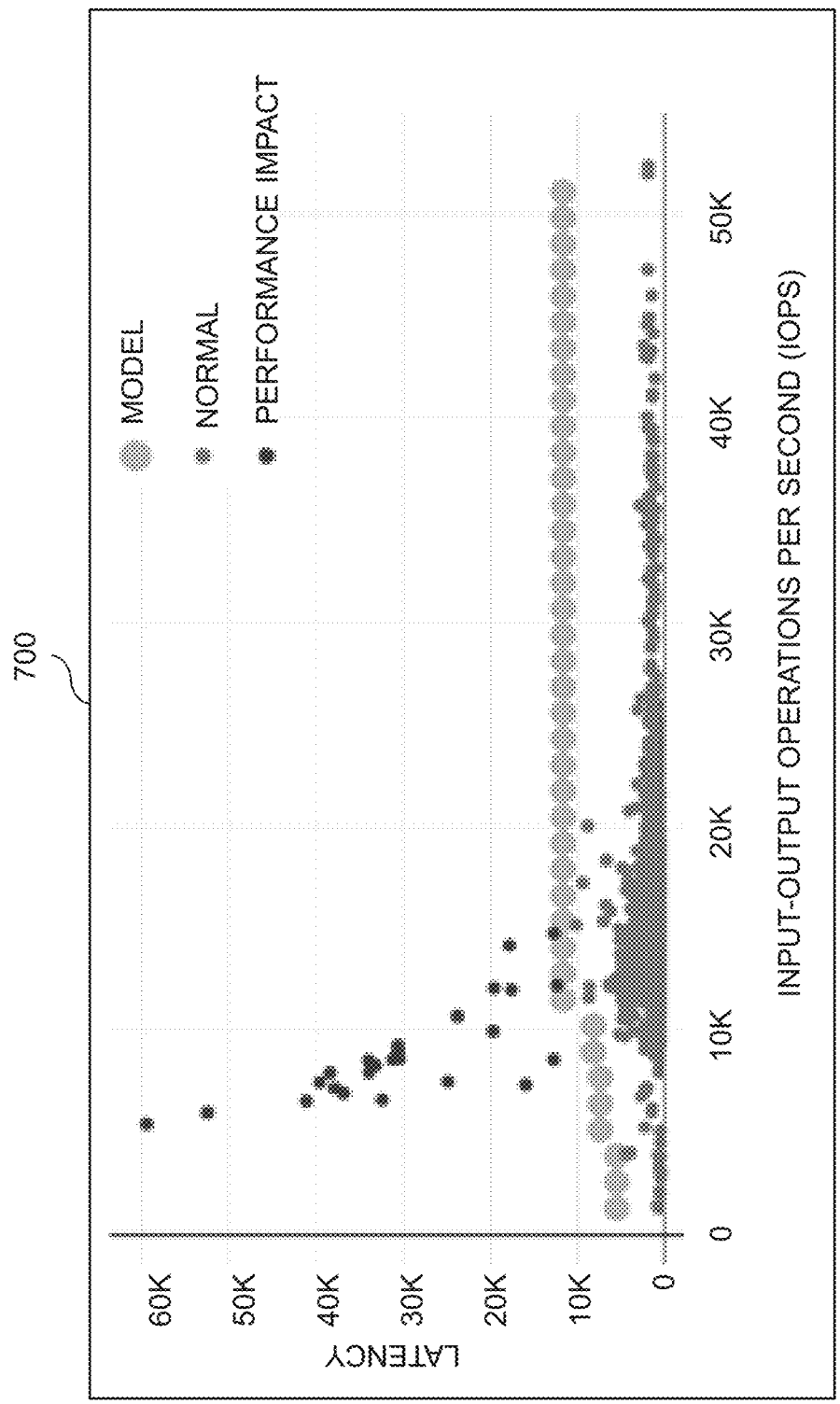
FIGS. 7A-7D show plots illustrating an optional adjustment for performance impact detection that takes into account data adjacent identified performance impacts in an illustrative embodiment.
Figure 7B:
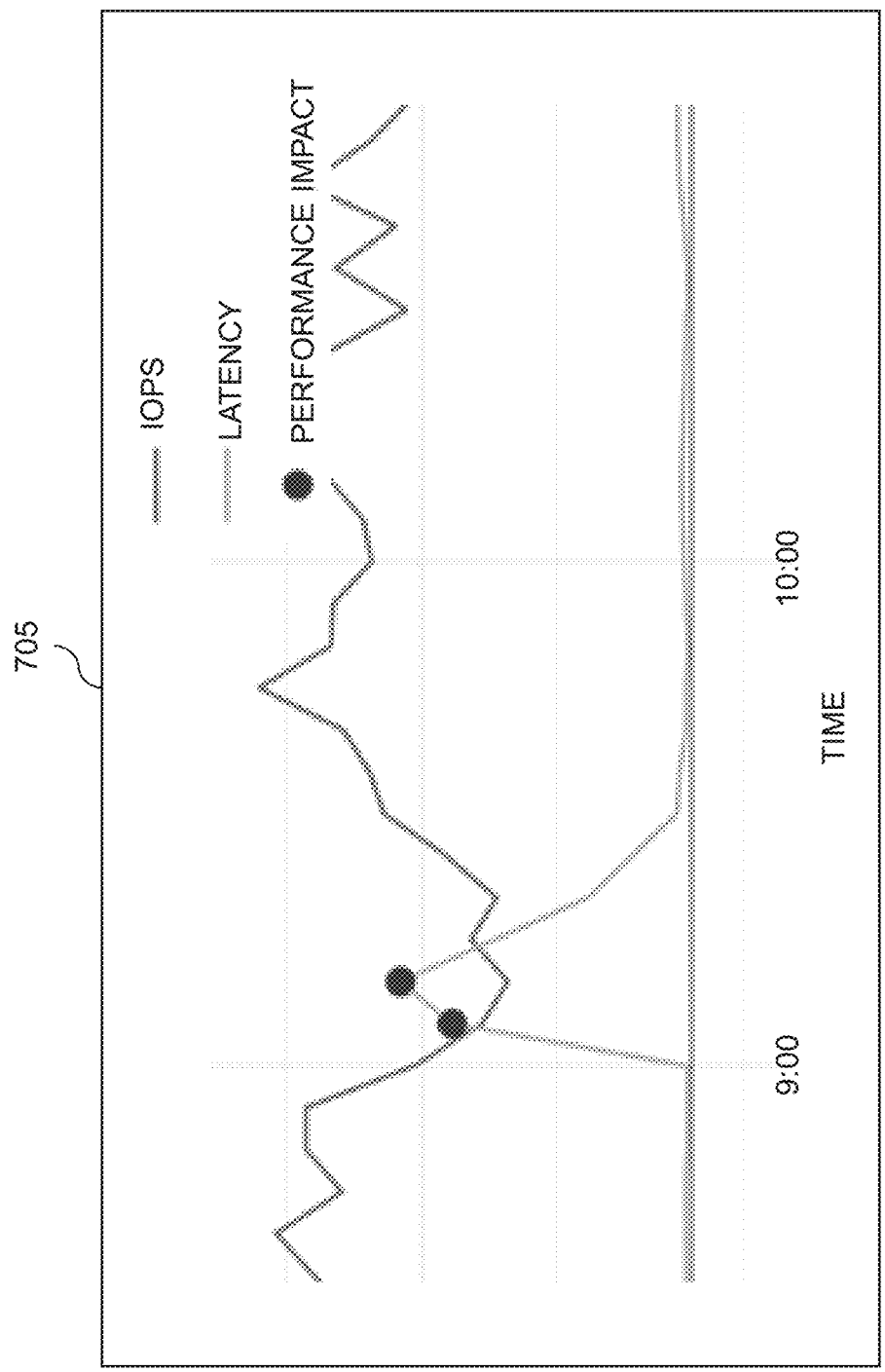
Figure 7C:
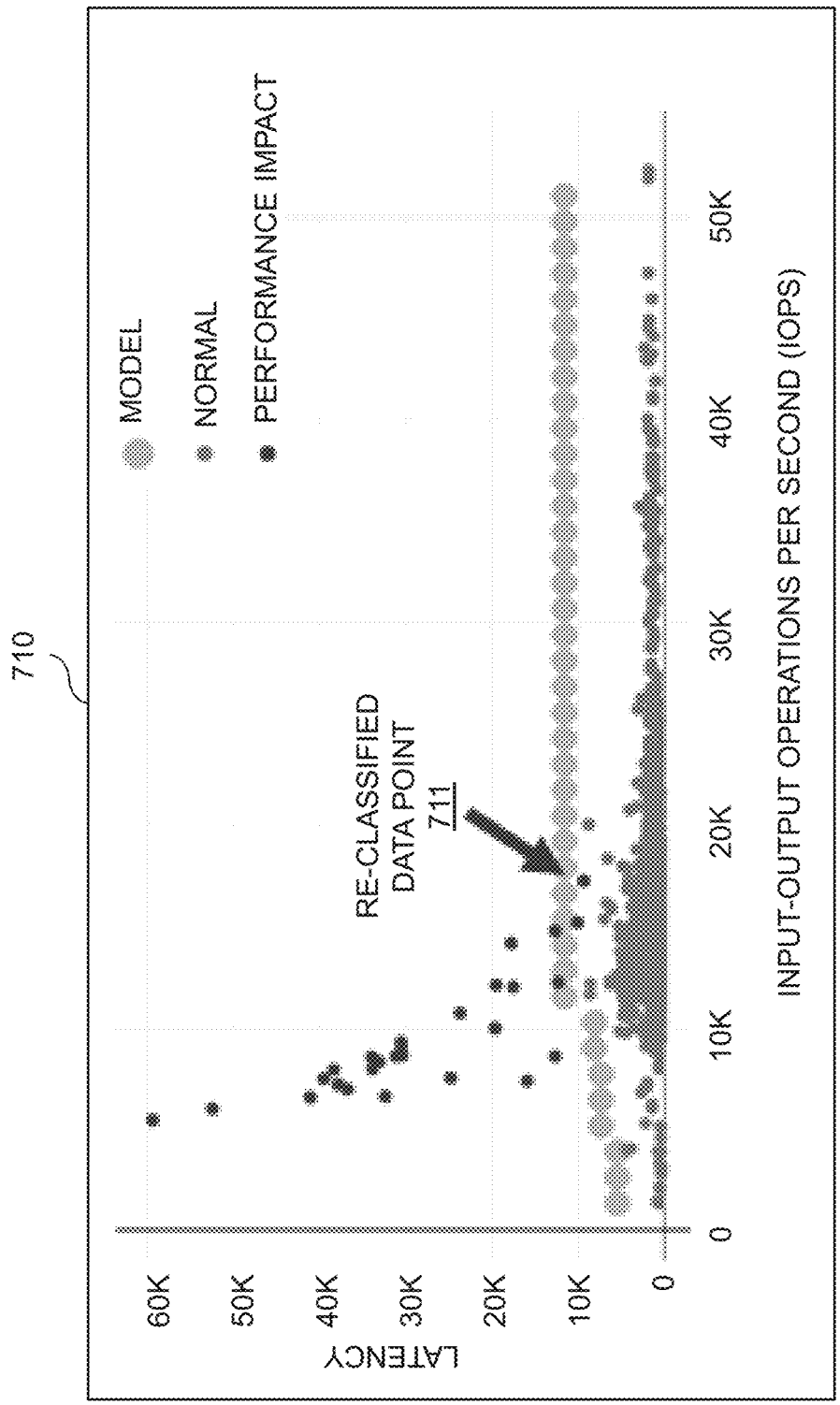
Figure 7D:
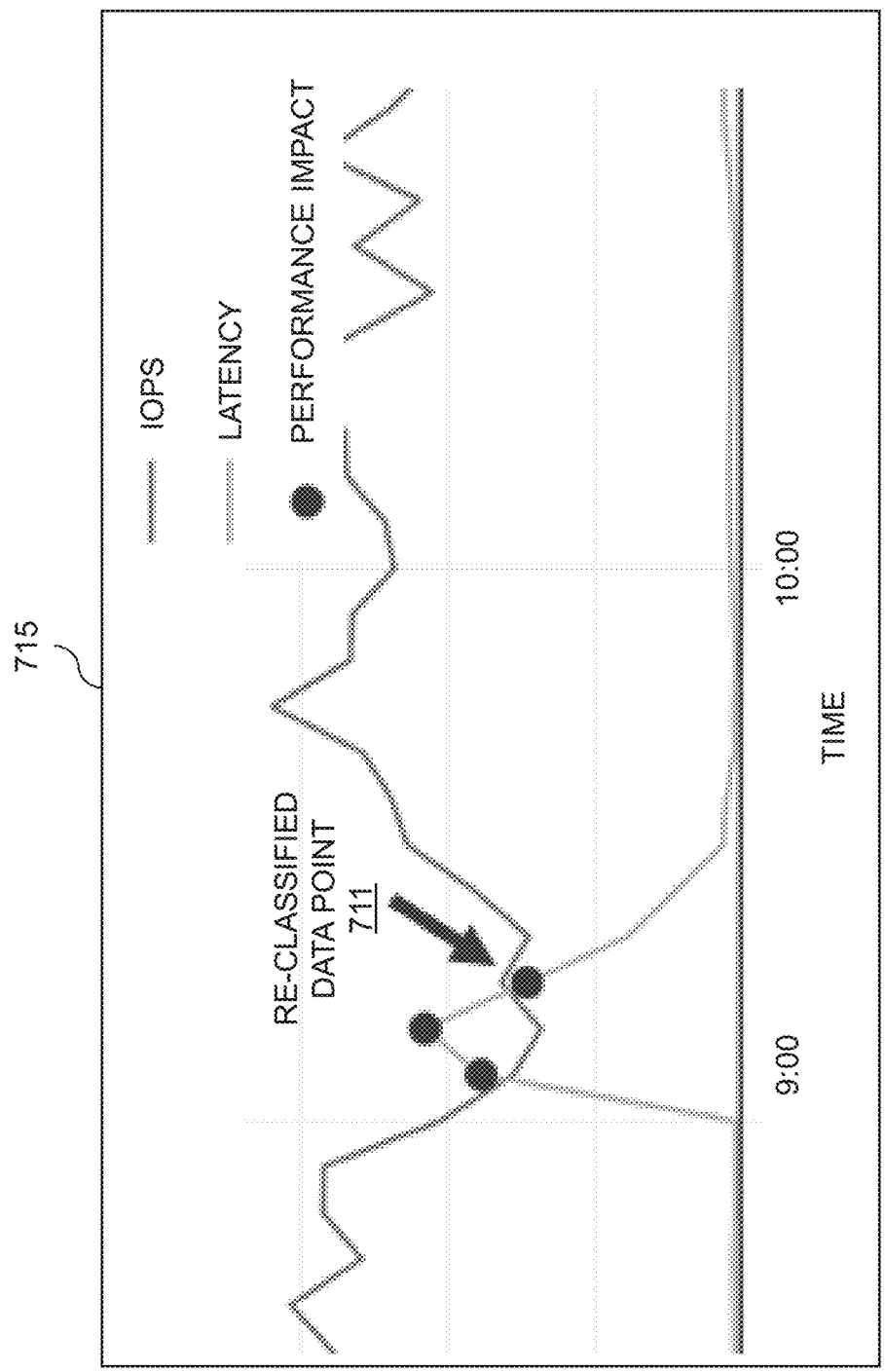

In some embodiments, various optional adjustments are made to the performance impact detection. For example, performance impacts often do not occur and disappear suddenly. Thus, some embodiments may examine the data immediately before and after identified performance impacts, and include such adjacent data points as performance impacts if they are close (e.g., within some designated threshold distance) to the model line. FIG. 7A shows a plot 700 of latency versus IOPS for a given storage workload type, illustrating a model generated utilizing the techniques described above, as well as a set of normal data points and performance impact data points. FIG. 7B shows a plot 705 of IOPS and latency over time, with performance impact data points highlighted. The model shown in plot 700 defines "normal" performance for the given storage workload type. FIG. 7C shows a plot 710 of latency versus IOPS for the given storage workload type following the optional performance impact detection adjustment that examines data points immediately before and after identified performance impacts. More particularly, plot 710 illustrates a "re-classified" data point 711, representing a data point that was considered normal in the plot 700 but which is now re-classified as a performance impact in the plot 710 (e.g., as it is both within a designated threshold time of an identified performance impact, and is within a designated threshold distance of the model line). FIG. 7D shows a plot 715 of IOPS and latency over time, with performance impact data points highlighted, including the re-classified data point 711. As illustrated in the plot 715 of FIG. 7D, although the re-classified data point 711 is a data point on the latency curve which is below the IOPS curve, this data point is re-classified as a performance impact since it is within the designated threshold time of an identified performance impact and is within a designated threshold distance of the model line from plot 710.

Figure 8A:
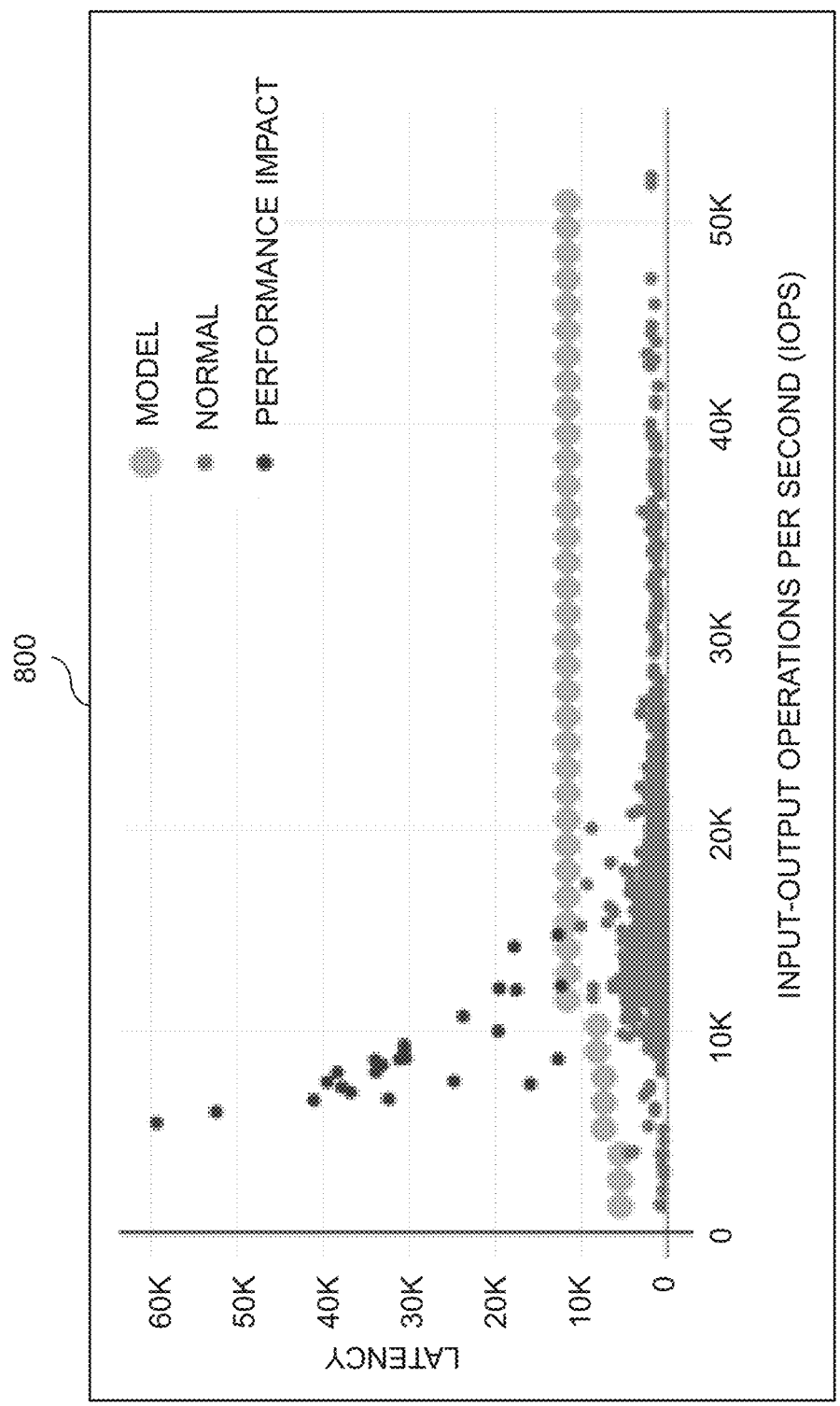
FIGS. 8A-8D show plots illustrating an optional adjustment for performance impact detection that takes into account performance impact duration in an illustrative embodiment.
Figure 8B:
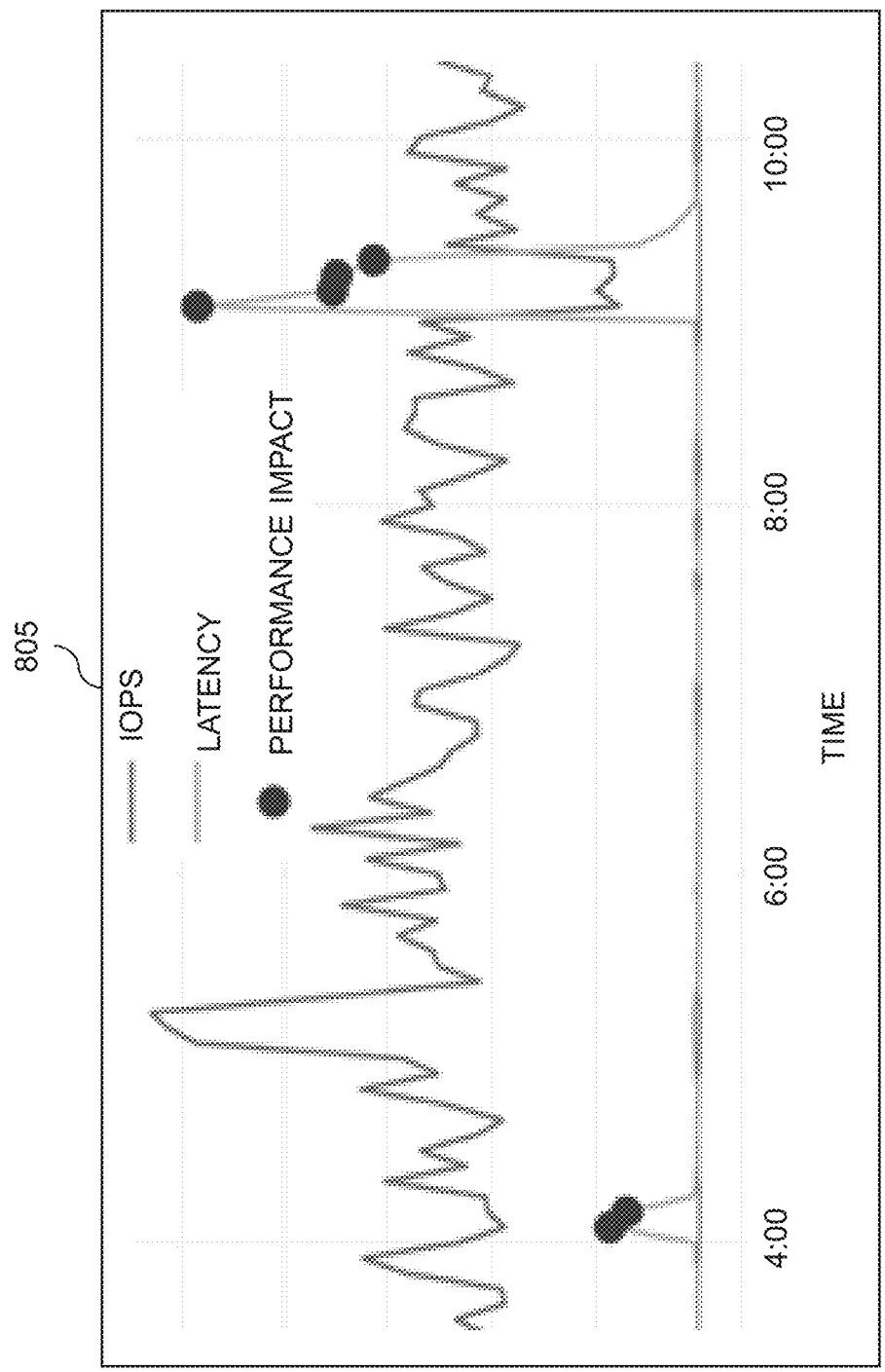
Figure 8C:
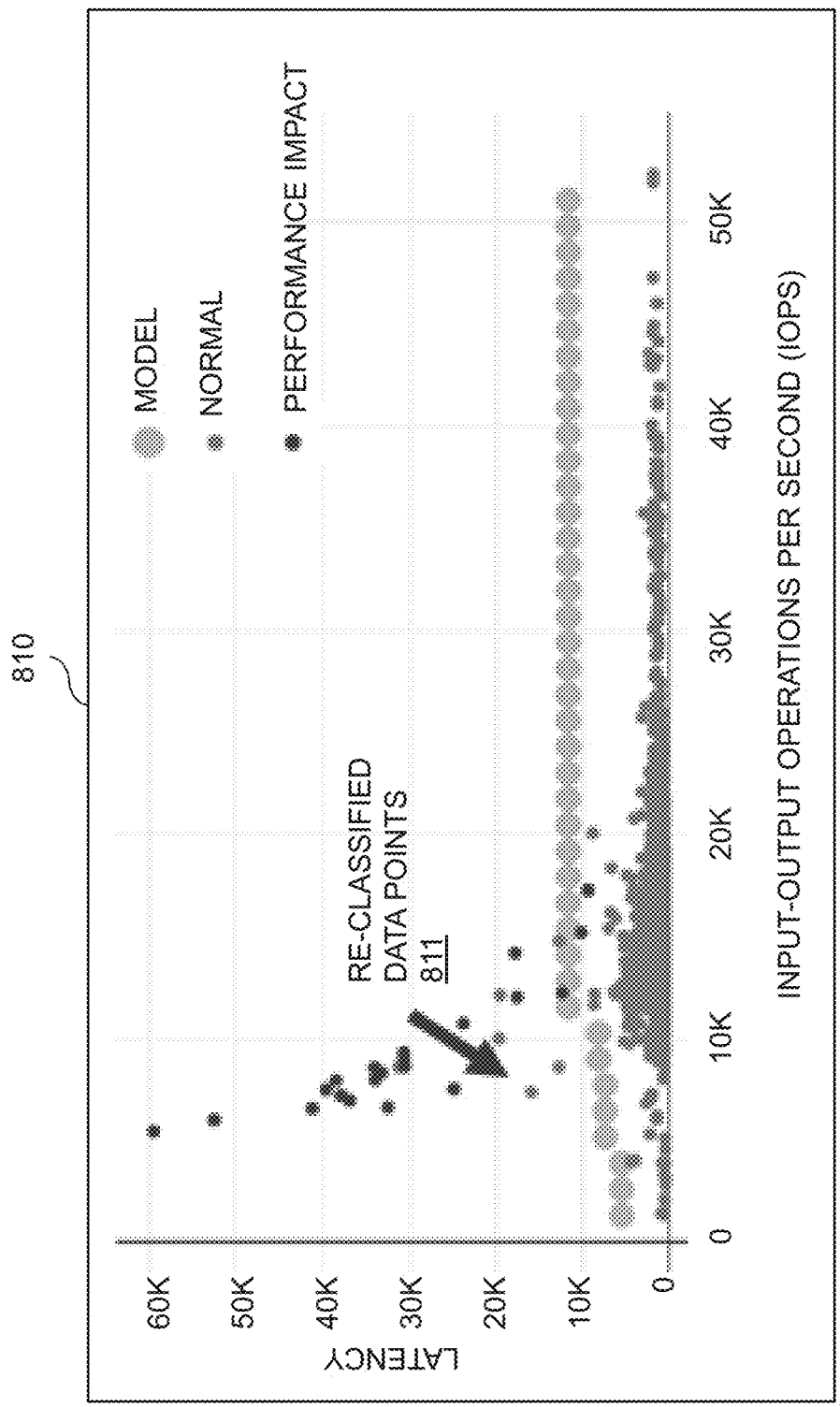
Figure 8D:
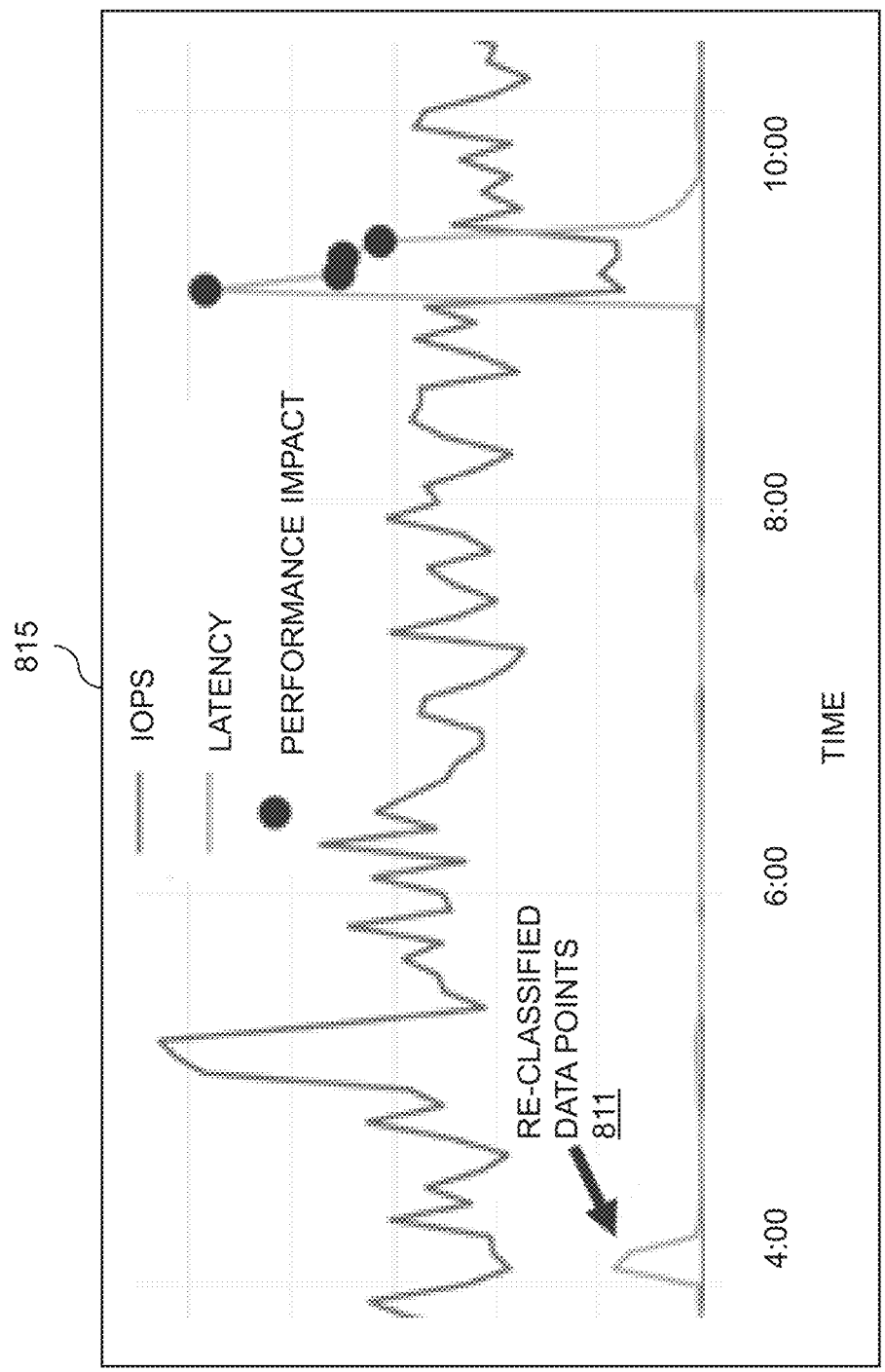

As another example, performance impacts that last longer are more damaging, and thus an optional filter may be applied to report only those performance impacts with a long duration (e.g., as defined by a designated duration threshold, such as filtering out performance impacts that last for less than 15 minutes). FIG. 8A shows a plot 800 of latency versus IOPS for a given storage workload type, illustrating a model generated utilizing the techniques described above, as well as a set of normal data points and performance impact data points. FIG. 8B shows a plot 805 of IOPS and latency over time, with performance impact data points highlighted. The model shown in plot 800 defines "normal" performance for the given storage workload type. FIG. 8C shows a plot 810 of latency versus IOPS for the given storage workload type following the optional performance impact detection adjustment that filters out performance impacts less than the designated duration threshold (e.g., 15 minutes). More particularly, plot 810 illustrates "re-classified" data points 811, representing data points for an identified performance impact that lasted less than the designated duration threshold (e.g., 15 minutes). FIG. 8D shows a plot 815 of IOPS and latency over time, with performance impact data points highlighted, including the re-classified data points 811. As illustrated in the plot 815 of FIG. 8D, the re-classified data points 811, which were labeled as performance impacts in plot 805, are not labeled as performance impacts in plot 815 after filtering since this performance impact lasted less than the designated duration threshold (e.g., 15 minutes).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for detecting performance impacting events using queuing curve analysis will now be described in greater detail with reference to FIGS. 9 and 10. Although described in the context of system 100, these platforms may also be used to implement at least portions of other information processing systems in other embodiments.

Figure 9:
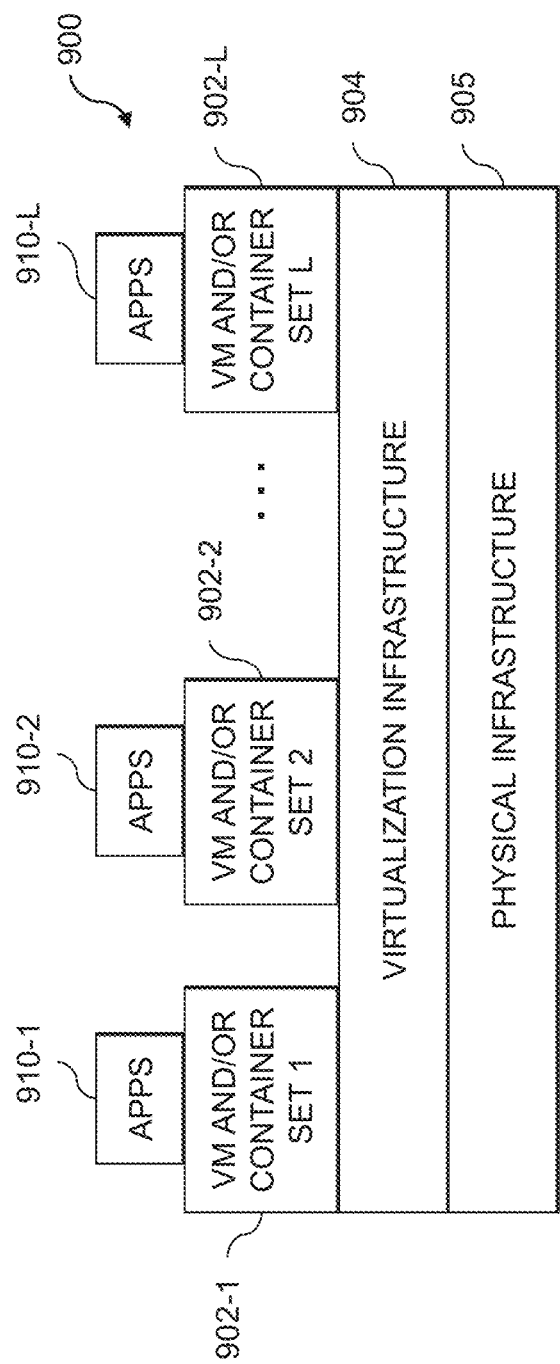

FIG. 9 shows an example processing platform comprising cloud infrastructure 900. The cloud infrastructure 900 comprises a combination of physical and virtual processing resources that may be utilized to implement at least a portion of the information processing system 100 in FIG. 1. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for detecting performance impacting events using queuing curve analysis as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, models, metrics, queuing curves, performance impacting events, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
obtaining performance data for a plurality of workloads, the plurality of workloads comprising two or more different types of storage workloads;
selecting a subset of the performance data corresponding to a subset of the plurality of workloads having a given workload type, the given workload type characterizing a designated range of input-output sizes for input-output operations and a designated range for a percentage of input-output operations which are read operations;
generating a model characterizing an expected performance of the given workload type by analyzing the selected subset of the performance data to estimate a queuing curve characterizing the expected performance of the given workload type, the expected performance of the given workload type characterizing expected latency as a function of input-output operations per second for the given workload type;
determining a quality of the generated model utilizing two or more quality metrics;
responsive to determining that the quality of the generated model is above a designated threshold quality level corresponding to scores for each of the two or more quality metrics exceeding designated minimum threshold scores for each of the two or more quality metrics, utilizing the generated model to identify one or more performance impacting events for a given workload of the given workload type, wherein identifying a given one of the one or more performance impacting events comprises:

identifying a first set of one or more data points in the selected subset of the performance data, the first set of one or more data points falling outside the expected performance of the given workload type according to the generated model;

identifying a second set of one or more data points, in the selected subset of the performance data, falling within the expected performance of the given workload type according to the generated model, the second set of one or more data points having a designated relationship with the first set of one or more data points in the selected subset of the performance data, the designated relationship comprising data points in the selected subset of the performance data that (i) occur within a designated threshold time at least one of prior to and subsequent to at least one data point in the first set of one or more data points and (ii) are within a designated threshold distance of a model line of the queuing curve; and classifying the second set of one or more data points as belonging to the given performance impacting event; and responsive to identifying the given performance impacting event for the given workload of the given workload type, migrating the given workload from a first storage system having a first set of performance characteristics to a second storage system having a second set of performance characteristics, the second set of performance characteristics being different than the first set of performance characteristics.

2. The apparatus of claim 1 wherein the performance data for the plurality of workloads comprises two or more performance metrics, the two or more performance metrics comprising a latency metric and a utilization metric, and wherein generating the model characterizing the expected performance of the given workload type comprises estimating the queuing curve over a range of values of the latency metric and the utilization metric.

3. The apparatus of claim 2 wherein estimating the queuing curve over the range of values of the latency metric and the utilization metric comprises finding a best fitting curve utilizing at least one of linear regression and exponential regression.

4. The apparatus of claim 3 wherein estimating the queuing curve over the range of values of the latency metric and the utilization metric further comprises adjusting the best fitting curve based at least in part on a variance of the selected subset of the performance data.

5. The apparatus of claim 3 wherein estimating the queuing curve over the range of values of the latency metric and the utilization metric further comprises dividing the queuing curve into two or more regions of values of the latency metric and the utilization metric, and adjusting each of the two or more regions of the best fitting curve individually.

6. The apparatus of claim 3 wherein estimating the queuing curve over the range of values of the latency metric and the utilization metric further comprises:

determining an expected pattern of the queuing curve, the expected pattern of the queuing curve comprises an increasing curve where the value of the latency metric increases as the value of the utilization metric increases; and adjusting the best fitting curve to fit the expected pattern of the queuing curve.

7. The apparatus of claim 1 wherein the two or more quality metrics comprise two or more of:

a horizontal score measuring a coverage of the selected subset of the performance data in a first axis of the queuing curve representing a utilization metric for the given workload type;

a regression score measuring a fitness of the queuing curve to the selected subset of the performance data;

a distance score measuring a distance between portions of the selected subset of the performance data corresponding to the expected performance and portions of the selected subset of the performance data corresponding to performance impacting events; and an aggregation score measuring a duration of performance impacting events.

8. The apparatus of claim 1 wherein utilizing the generated model to identify one or more performance impacting events for the given workload of the given workload type comprises filtering out ones of the first set of one or more data points corresponding to one of the one or more performance impacting events that lasts less than a designated threshold duration.

9. The apparatus of claim 1 wherein selecting the subset of the performance data corresponding to the subset of the plurality of workloads having the given workload type comprises:

dividing the performance data into two or more bins corresponding to the two or more different types of workloads based at least in part on values of an input-output operation size metric and a percentage of read operations metric of each of the one or more data points; and selecting a given one of the two or more bins.

10. The apparatus of claim 9 wherein selecting the given bin comprises selecting a given one of the two or more bins comprising at least a threshold number of the one or more data points.

11. The apparatus of claim 1 wherein the at least one processing device is further configured, responsive to identifying one or more performance impacting events for the given workload of the given workload type, to apply throttling to the given workload.

12. The apparatus of claim 1 wherein the at least one processing device is further configured, responsive to identifying one or more performance impacting events for the given workload of the given workload type, to adjust one or more parameters of the given workload.

13. A computer program product comprising a non-transitory processor-readable storage medium having stored therein program code of one or more software programs, wherein the program code when executed by at least one processing device causes the at least one processing device to perform steps of:

obtaining performance data for a plurality of workloads, the plurality of workloads comprising two or more different types of storage workloads;

selecting a subset of the performance data corresponding to a subset of the plurality of workloads having a given workload type, the given workload type characterizing a designated range of input-output sizes for input-output operations and a designated range for a percentage of input-output operations which are read operations;

generating a model characterizing an expected performance of the given workload type by analyzing the selected subset of the performance data to estimate a queuing curve characterizing the expected performance of the given workload type, the expected performance of the given workload type characterizing expected latency as a function of input-output operations per second for the given workload type;

determining a quality of the generated model utilizing two or more quality metrics;

responsive to determining that the quality of the generated model is above a designated threshold quality level corresponding to scores for each of the two or more quality metrics exceeding designated minimum threshold scores for each of the two or more quality metrics, utilizing the generated model to identify one or more performance impacting events for a given workload of the given workload type, wherein identifying a given one of the one or more performance impacting events comprises:

identifying a first set of one or more data points in the selected subset of the performance data, the first set of one or more data points falling outside the expected performance of the given workload type according to the generated model;

identifying a second set of one or more data points, in the selected subset of the performance data, falling within the expected performance of the given workload type according to the generated model, the second set of one or more data points having a designated relationship with the first set of one or more data points in the selected subset of the performance data, the designated relationship comprising data points in the selected subset of the performance data that (i) occur within a designated threshold time at least one of prior to and subsequent to at least one data point in the first set of one or more data points and (ii) are within a designated threshold distance of a model line of the queuing curve; and classifying the second set of one or more data points as belonging to the given performance impacting event; and responsive to identifying the given performance impacting event for the given workload of the given workload type, migrating the given workload from a first storage system having a first set of performance characteristics to a second storage system having a second set of performance characteristics, the second set of performance characteristics being different than the first set of performance characteristics.

14. The computer program product of claim 13 wherein the performance data for the plurality of workloads comprises two or more performance metrics, the two or more performance metrics comprising a latency metric and a utilization metric, and wherein generating the model characterizing the expected performance of the given workload type comprises estimating the queuing curve over a range of values of the latency metric and the utilization metric.

15. A method comprising:

obtaining performance data for a plurality of workloads, the plurality of workloads comprising two or more different types of storage workloads;

selecting a subset of the performance data corresponding to a subset of the plurality of workloads having a given workload type, the given workload type characterizing a designated range of input-output sizes for input-output operations and a designated range for a percentage of input-output operations which are read operations;

generating a model characterizing an expected performance of the given workload type by analyzing the selected subset of the performance data to estimate a queuing curve characterizing the expected performance of the given workload type, the expected performance of the given workload type characterizing expected latency as a function of input-output operations per second for the given workload type;

determining a quality of the generated model utilizing two or more quality metrics;

responsive to determining that the quality of the generated model is above a designated threshold quality level corresponding to scores for each of the two or more quality metrics exceeding designated minimum threshold scores for each of the two or more quality metrics, utilizing the generated model to identify one or more performance impacting events for a given workload of the given workload type, wherein identifying a given one of the one or more performance impacting events comprises:

identifying a first set of one or more data points in the selected subset of the performance data, the first set of one or more data points falling outside the expected performance of the given workload type according to the generated model;

identifying a second set of one or more data points, in the selected subset of the performance data, falling within the expected performance of the given workload type according to the generated model, the second set of one or more data points having a designated relationship with the first set of one or more data points in the selected subset of the performance data, the designated relationship comprising data points in the selected subset of the performance data that (i) occur within a designated threshold time at least one of prior to and subsequent to at least one data point in the first set of one or more data points and (ii) are within a designated threshold distance of a model line of the queuing curve; and classifying the second set of one or more data points as belonging to the given performance impacting event; and responsive to identifying the given performance impacting event for the given workload of the given workload type, migrating the given workload from a first storage system having a first set of performance characteristics to a second storage system having a second set of performance characteristics, the second set of performance characteristics being different than the first set of performance characteristics;

wherein the method is performed by at least one processing device comprising a processor coupled to a memory.

16. The method of claim 15 wherein the performance data for the plurality of workloads comprises two or more performance metrics, the two or more performance metrics comprising a latency metric and a utilization metric, and wherein generating the model characterizing the expected performance of the given workload type comprises estimating the queuing curve over a range of values of the latency metric and the utilization metric.

17. The method of claim 16 wherein estimating the queuing curve over the range of values of the latency metric and the utilization metric comprises finding a best fitting curve utilizing at least one of linear regression and exponential regression.

18. The method of claim 17 wherein estimating the queuing curve over the range of values of the latency metric and the utilization metric further comprises adjusting the best fitting curve based at least in part on a variance of the selected subset of the performance data.

19. The method of claim 17 wherein estimating the queuing curve over the range of values of the latency metric and the utilization metric further comprises dividing the queuing curve into two or more regions of values of the latency metric and the utilization metric, and adjusting each of the two or more regions of the best fitting curve individually.

20. The method of claim 17 wherein estimating the queuing curve over the range of values of the latency metric and the utilization metric further comprises:
- determining an expected pattern of the queuing curve, the expected pattern of the queuing curve comprises an increasing curve where the value of the latency metric increases as the value of the utilization metric increases; and
- adjusting the best fitting curve to fit the expected pattern of the queuing curve.

* * * * *